United States Patent [19]

Zückert

[11] 4,229,331

[45] Oct. 21, 1980

[54] PROCESS FOR PRODUCING WATER-EMULSIFIABLE AIR-DRYING BINDERS, THE BINDERS, AND EMULSIONS MADE THEREFROM

[75] Inventor: Bertram Zückert, Graz, Austria

[73] Assignee: Vianova Kunstharz, A.G., Werndorf, Austria

[21] Appl. No.: 966,867

[22] Filed: Dec. 6, 1978

[30] Foreign Application Priority Data

Dec. 12, 1977 [AT] Austria .................................. 8838/77

[51] Int. Cl.$^2$ .......................... C09D 3/54; C09D 3/56; C09D 3/66
[52] U.S. Cl. .................................. 260/20; 260/19 N; 260/19 UA
[58] Field of Search .................. 260/20, 19 UA, 19 N

[56] References Cited

U.S. PATENT DOCUMENTS

| | | | |
|---|---|---|---|
| 2,634,245 | 4/1953 | Arndt | 260/22 T |
| 2,852,475 | 9/1958 | Christenson et al. | 260/20 |
| 2,853,459 | 9/1958 | Christenson et al. | 260/850 |
| 3,133,032 | 5/1964 | Jen et al. | 260/850 |
| 3,223,659 | 12/1965 | Curtice et al. | 260/842 |
| 3,379,548 | 4/1968 | Jen | 106/245 |
| 3,437,615 | 4/1969 | Hanson | 260/21 |
| 3,437,618 | 4/1969 | Taft | 260/21 |
| 3,438,795 | 4/1969 | Schroeder et al. | 106/252 |
| 3,442,835 | 5/1969 | Curtice et al. | 260/21 |
| 3,457,206 | 7/1969 | Tonner | 260/29.2 EP |
| 3,639,315 | 2/1972 | Rodriguez | 260/29.2 TN |
| 3,960,789 | 6/1976 | Daimer et al. | 260/20 |
| 3,979,346 | 9/1976 | Zuckert et al. | 260/20 |
| 4,029,617 | 6/1977 | Dhein et al. | 260/20 |

FOREIGN PATENT DOCUMENTS

| | | | |
|---|---|---|---|
| 285422 | 4/1965 | Australia | 260/22 R |
| 2330744 | 6/1977 | France . | |

*Primary Examiner*—Ronald W. Griffin
*Attorney, Agent, or Firm*—A. W. Breiner

[57] ABSTRACT

Process for producing water-emulsifiable air-drying paint binders, the binders, and the emulsions therefrom characterized in that in a first reaction step 10 to 35 percent by weight of a polyethylene glycol having an average molecular weight of between about 500 and 5000, and 5 to 25 percent by weight of a low molecular weight formaldehyde condensate of an alkyl phenol and/or aryl phenol obtained under alkaline conditions are reacted at from 100° to 160° C., and the reaction product condensed in a second reaction step at from 180° to 250° C. with 40 to 85 percent by weight of a natural or synthetic substantially hydroxy-free ester of unsaturated oil fatty acids and polyols; and the obtained product in a third reaction step processed to provide an alkyl resin or oil binder, the weight ratios and reaction conditions being chosen in order that the final product has a level of from about 4 to 12 percent by weight of polyethylene glycol and an acid value of 10 to 30 mg KOH/g. The binders of the process when emulsified and used in the preparation of a paint have excellent storage stability and provide cured paint coatings having, inter alia, excellent water resistance.

27 Claims, No Drawings

PROCESS FOR PRODUCING WATER-EMULSIFIABLE AIR-DRYING BINDERS, THE BINDERS, AND EMULSIONS MADE THEREFROM

This invention is directed to a process for producing water-emulsifiable air-drying binders based on modified drying fatty oils; to the binders, and to the emulsions prepared therefrom, which emulsions have improved stability, drying characteristics, and water resistance with respect to prior art emulsions.

The term "modified drying fatty oils" as defined by the literature authorities at times includes modifications of fatty oils where the modification is effected either at the double bonds (polymerized or isomerized oils, dehydrated castor oil, vinylated oils or oils modified with cyclopentadiene, and the like), or through a change in the glyceride system (alkyd resins, urethane resins, and the like). See KITTEL, "Lehrbuch der Lacke und Beschichtungen," W. A. Colomb, Stuttgart-Berlin, 1971. In the present application "modified products of fatty oils" is used to designate alkyd resins or oil binders.

A great number of patents are directed to the preparation of water-emulsifiable alkyd resins and oil binders wherein polyethylene glycol (PEG) is introduced into the molecule. Note, for example, U.S. Pat. Nos. 2,634,245; 2,853,459; 3,133,032; 3,223,659; 3,379,548; 3,437,615; 3,437,618; 3,438,795; 3,442,835; 3,457,206, and 3,639,315; DT-OS No. 14 95 032; Great Britain Pat. No. 989,252; Great Britain Pat. No. 991,627; Great Britain Pat. No. 1,038,696, and Great Britain Pat. No. 1,044,821. Other patent specifications refer to the preparation of improved emulsions through combination of PEG-rich alkyd resins with PEG-free alkyds, note, for example, AT-PS 333,035; or through additional modification with hydrophilic compounds, note, for example, AT-PS 336,277. The various improvements or attempts at improvement have not removed a principal shortcoming; namely, the unsatisfactory storage stability of the emulsions and the paints prepared therefrom. After a few weeks at ambient temperature, and faster at elevated temperature, the paints separate into two layers, which cannot be integrated, and, thus, the paints become unusable. Furthermore, drying speed and water resistance of the paint films are not completely satisfactory.

It has been determined that the unsatisfactory storage stability of the alkyd emulsions is not a merely physical phenomenon. Prior to coagulation there is a partial saponification of the resin molecules. It is apparent that the known emulsions provide favorable conditions for attack by hydrolysis. The aqueous phase is slightly alkaline, with the normal pH-values being from 7 to 10. The surface area available for attack is large and it increases with falling particle diameter. Thus, emulsions having a fine particle size which have the best stability before aging are particularly sensitive.

The known methods for the preparation of PEG-modified alkyds have uniformly introduced the PEG content over the ester linkages. These ester linkages are split relatively easily, since the space conditions for attack by water are favored through the hydratization of the polyethylene glycol chain. Through the splitting off of the polyethylene glycol the molecules lose the amphipatic character and, thus, the emulsifier effect.

An enhanced resistance to saponification can be obtained through the linking of PEG to alkyd resins via amineformaldehyde resins, as suggested in Austrian Pat. Spec. No. 339,450. Binders prepared according to this method are well suited for stoving enamels, since the unconsumed functional groups of the amine resin participate in the stoving process and, therefore, in the cross-linking of the film. For air-drying paints this method is less suited, since at ambient temperature the amine resin does not react, providing soft and water-sensitive films. Furthermore, the process cannot be applied to long-oil alkyds, with low hydroxyl content, or to oil binders due to lack of compatibility.

The modification of alkyd resins and oils with phenolic resins has also been suggested. DT-PS 23 23 546 and DT-OS 24 46 439 disclose water-dilutable phenol modified alkyds. The described products do not contain polyethylene glycol. The emulsifying capability is solely based on salt formation at the carboxy groups. The resins have high acid numbers and, thus, require large quantities of amines, which are mostly toxic, to render the products water-soluble. It is evident that these ionic groupings are largely kept intact on airdrying, thus adversely affecting the resistance characteristics of the films.

It has now been found that air-drying paint binders can be obtained which can be further processed to give aqueous emulsions with excellent storage stability without the use of additional emulsifiers if a sequence of reaction steps is followed whereby a polyethylene glycol (PEG) is first etherified with a phenol formaldehyde condensate; the PEG-modified phenolic resin then reacted with an unsaturated, substantially hydroxyfree oil fatty acid polyester, in particular with a drying oil, and the PEG-phenolic-modified reaction product thereafter processed in known manner to give an alkyd resin or oil binder. Accordingly, the present invention is directed to a process for producing water-emulsifiable air-drying paint binders based on modified drying oils, and to the products obtained, characterized in that in a first reaction step 10–35% by weight of a polyethylene glycol with an average molecular weight of between about 500 and 5000, and 5–25% by weight of a low molecular weight formaldehyde condensate of a mono ($C_3$–$C_9$)alkylphenol and/or an arylphenol, obtained through alkaline condensation, are reacted at from about 100° to 160° C., and the reaction product obtained is condensed in a second reaction step at from 180° to 250° C. with 40–85% by weight of a natural or synthetic substantially hydroxy-free ester of unsaturated oil fatty acids and polyols and the obtained product in a third reaction step is processed to give an alkyd resin or oil binder, the weight ratios and reaction conditions being chosen in order that the final product has a level of from 4 to 12 percent by weight of polyethylene glycol and an acid value of from 10 to 30 mg KOH/g.

With the method of the invention fine particle transparent emulsions are obtained which are exceptionally well suited for the formulation of air-drying coating compositions. The emulsions exhibit greatly improved storage stability over those of the known prior art, even at elevated temperature, and also possess excellent drying characteristics. The coatings produced therefrom exhibit very good water resistance.

In the first reaction step the PEG is reacted with the methylol groups of the phenol formaldehyde condensate through etherification. For this reaction preferably an equivalent excess of phenol resin is used in order to guarantee quantitative esterification of the PEG and also to provide reaction sites for the condensate to react with the oil. This reaction may optionally be catalyzed by adding an organic acid. For the second reaction step it can be assumed that chromane ring sections are formed between the phenolic resin and the double bond linkages of the fatty acids. This reaction, according to Hultzsch, "Chemie der Phenolharze," Berlin, Gottingen, Heidelberg, Springer 1950, occurs over a chinon methide intermediate step.

The methylol ether linkage between PEG and the benzol nucleus from the phenolic resin is very stable in a slightly alkaline medium. Since the next ester linkage is separated from the PEG chain by the voluminous chromane group and part of the fatty acid chain, water attack is aggravated. Further, even with saponification of this ester linkage the emulsifier effect of the PEG is maintained, since the chromane fatty acid link remains in the molecule as a lyophilic group. Furthermore, it has been found that in applying the process of the present invention to the preparation of emulsions having equivalent particle size to the particle size of prior art emulsions, less PEG is necessary. One apparent reason, among others, is a more complete reaction of the PEG with the reaction partners through the stepwise reaction and an emphasis on an amphipatic construction of the molecule through direct linking of the PEG to the lyophilic phenol-fatty acid complex. This provides a considerable improvement in drying speed as well as hardness and water resistance to the paint films. In addition, the phenolic component, owing to exerting a control on autoxidation, provides an improvement in the through-hardening of the film.

The molecular weight of the polyethylene glycol component used according to the present invention lies between about 500 and 5000, preferably between about 1000 and 3000.

Suitable phenol formaldehyde condensates are the low molecular weight reaction products produced in alkaline medium from monoalkyl phenols and/or aryl phenols and formaldehyde, normally called resols, carrying an average of at least 1.5, preferably 1.8 methylol groups, i.e., a methylol functionality of at least 1.5 and preferably 1.8. The alkyl phenols to be employed are those carrying alkyl substituents with from 3 to 9 carbon atoms, including p-isopropylphenol, butylphenol, amylphenol, octylphenol, and nonylphenol. P-tert. butylphenol is preferred. Preferred aryl phenols are Bisphenol A and cumylphenol especially in mixture with alkyl phenols. A catalyst for the reaction between PEG and the phenol condensate, preferably an organic acid, can be employed in an amount up to 5 percent by weight of the raw materials of the reaction step. Suitable acids are the unsaturated oil fatty acids, acrylic acid, fumaric acid, and the various phthalic acid isomers.

Suitable compounds for the reaction with the PEG-resolreaction product are the unsaturated oils with an iodine number of over 125 as well as substantially hydroxy-free esters of the unsaturated fatty acids of such oils with polyols. Among the suitable raw materials are the drying and semi-drying oils, such as linseed oil, soya oil, safflower oil, sunflower oil, dehydrated castor oil, as well as the esters of the unsaturated fatty acids of such oils with, for example, trimethylolethane, trimethylolpropane, pentaerythritol, neopentylglycol, and the like. Oils with at least a part of the double bonds in conjugated position are particularly suited including tung oil, oiticica oil, various grades of dehydrated castor oil, synthetically isomerized oils and synthetic esters containing such fatty acids, and the like.

The etherification reaction between PEG and the phenolformaldehyde condensate is carried out at from 100° to 160° C. Optionally, the removal of the reaction water may be accelerated by azeotropic entraining agents. The reaction of the condensate with the unsaturated centers of the fatty acid, i.e., step 2 of the process, is carried out at from 180° to 250° C.

The products obtained in step 2 of the process are further processed with the raw materials and according to methods known in the art for the processing of such raw materials to provide alkyd resins or oil binders, i.e., step 3 of the process. As an example only, alkyd resins can be produced through reesterification of the PEG-phenol modified oil with polyalcohols and subsequent esterification with polycarboxylic acids. Optionally, additional quantities of drying oils of the pertinent oil fatty acids and cyclic or aromatic carboxylic acids can be coemployed. Reaction of low molecular alkyd resin intermediate products from such raw materials with polyisocyanates, preferably in the presence of small quantities of aprotic solvents, provides urethane modified alkyds. Further, the alkyds can be modified through copolymerization with acrylic and/or other vinyl monomers or through the introduction of carboxy or hydroxy functional acryl and/or vinyl copolymers according to the monoglyceride process disclosed by Solomon in "The Chemistry Of Organic Film Formers," New York, 1967.

The water-emulsifiable oil binders may be stand oils, urethane oils, or rosin modified oils prepared according to known methods. In all cases the ratio between the components has to be chosen in order that the final product has a PEG content of from 4 to 12 percent by weight, and the reaction has to be conducted in order that an intrinsic viscosity of from 8 to 15 ml/g (measured in chloroform at 20° C.) and an acid value of from 10 to 30 mg KOG/g is obtained.

In a special embodiment of the process of the invention the etherification reaction between PEG and the phenol resol is carried out in the presence of a part or the total quantity of the unsaturated oil. This method is preferably used if the modified oil is to be further processed directly and in the same reactor. In the latter case, for step 1 the reactor charge would be too small in many cases to guarantee optimum reaction control. In some cases it can be of advantage to use a blend of a PEG-rich resin with a PEG-free resin according to AT-PS 333,035 in place of a uniformly PEG-modified resin, with the total level of PEG remaining within the stated range.

The resins are emulsified in water at from 50° to 100° C. Up to a total of 20 percent of organic auxiliary solvents, such as butanol or monoethylene glycol monobutyl ethers, can be used. The water used in the emulsification will contain sufficient organic or inorganic nitrogen base, such as triethylamine or ammonia, to neutralize 50 to 100 percent of the free carboxy groups of the resin.

The products produced according to the process of the invention are to form the base for air-drying water-dilutable paints prepared according to known methods. The paints may also be force-dried at temperatures of up to about 80° C. The products can also be formulated into stoving paints. In the latter case small quantities of amine resins are added to the paint as additional crosslinkers.

The following examples illustrate the process of the invention. Parts are by weight. The values stated for the intrinsic viscosity were measured in chloroform at 20° C. Phenol formaldehyde condensates used in the examples are as follows:

PK 1: 1 mol of p-tert. butylphenol and 2.1 moles of formaldehyde are reacted in known manner in an alkaline medium to provide a resol having an average of 1.9 moles of methylol groups in the molecule.

PK 2: A nonylphenol resol containing about 2 mols of methylol groups per molecule is prepared in known manner.

PK 3: A resol of 3 mols of p-tert. butylphenol, 1 mol of Bisphenol A, and 10 mols of formaldehyde is prepared in known manner to provide a resin with a methylol functionality of 2.2.

EXAMPLE 1

In a suitable reaction vessel, 320 parts of PEG with an average molecular weight of 1500, 200 parts PK 1 and 20 parts linseed oil fatty acid are reacted under the protection of inert gas for 80 minutes at 120° C. About 30 parts water is distilled off during the reaction. Thereafter, 900 parts tung oil are added and the temperature is raised to 200° C. After 75 minutes the reaction is finished.

282 parts of the above intermediate product are reesterified at 240° C. for 90 minutes in a resin reactor equipped for azeotropic distillation with 210 parts p-tert. butylbenzoic acid, 190 parts pentaerythritol, 76 parts linseed oil fatty acid and 0.4 parts lead octoate (10% metal) and 0.4 parts calcium octoate (4% metal). Upon addition of 160 parts phthalic anhydride and 40 parts tetrahydrophthalic anhydride the esterification is continued at 200° C. with azeotropic distillation (xylene) until an acid number of 25 mg KOH/g is reached. After distillation of the entraining agent the esterification is ended with the product having an acid number of 20 mg KOH/g and an intrinsic viscosity of 9 ml/g. The alkyd resin is diluted to a solids content of 90 percent with ethylene glycol monobutylether (BUGL) and, at 60° C. with vigorous stirring, 30 parts triethylamine and 1260 parts deionized water are added during a period of from 15 to 20 minutes. The resultant transparent thixotropic emulsion has a solids content of 40 percent and a pH-value of 8.5.

Examples 2–4

Following the procedures of Example 1, the following resins and emulsions therefrom are prepared. In the first step the oil (of step 2) can be present during the etherification without any change in the properties of the final product; however, the concentration of the catalysts has to be considered. The concentration of catalysts is given in parentheses.

| Example No. | 2 | 3 | 4(+++) |
|---|---|---|---|
| Step 1: PEG (φ mol-weight 1500) | — | 45 | 100 |
| PEG (φ mol-weight 3000) | 35 | — | — |
| PK 1 | — | 28 | 50 |
| PK 2 | 22 | — | — |
| PK 3 | — | — | — |
| tall oil(+) | 1.7(5) | — | — |
| linseed oil fatty acid | — | 2.5(10) | — |
| methacrylic acid | — | — | 1.5(3) |
| Step 2: Oiticicaoil | 85 | — | — |
| dehydrated castor oil | — | 100 | — |
| linseed oil | — | 100 | — |
| tung oil | — | — | 150 |
| Step 3: pentaerythritol | 95 | 90 | — |
| tung oil | — | — | 400 |
| rosin | 80 | — | 100 |
| tall oil(+) | 70 | — | — |
| linseed oil fatty acid | — | 30 | — |
| phthalic acid anhydride | 100 | 100 | — |
| benzoic acid | — | 80 | — |
| hard resin 1(++) | — | — | 230 |
| final acid value mg KOH/g | 22 | 16.5 | 28 |
| intrinsic viscosity | 8.8 | 9.6 | 14 |
| emulsifying: butanol | 50 | — | — |
| BUGL | — | to 95% | — |
| deionized water | 650 | 640 | 1500 |
| triethylamine | 18 | 16 | 50 |
| solids content % | 40 | 45 | 40 |
| pH-value | 8.6 | 9.1 | 9.3 |

(+)contains 80% tall oil fatty acids and 20% rosin acids.
(++)extremely hard, oil-compatible rosin modified maleic resin, melting range 110–125° C., acid value 15–25 mg KOH/g.
φ average
(+++)instead of the re-esterification and azeotropic esterification in this example in step 3, polymerization is carried out at 230° C.

EXAMPLE 5

A water-emulsifiable urethane alkyd is prepared as follows: in the presence of 85 parts of an isomerized linseed oil with a level of 40–45% of conjugated linoleic and linolenic fatty acid and an iodine number of 170–180, 40 parts of PEG (average molecular weight 1500) and 25 parts PK 2 are etherified at 140° C., 5 parts of linseed oil fatty acids being added as catalyst. After 60 minutes the temperature is raised to 200° C. and the batch is held at such temperature for 90 minutes.

Upon addition of 70 parts of linseed oil fatty acids, 90 parts of p-tert. butyl benzoic acid, 100 parts of pentaerythritol and 0.2 parts each of lead octoate and calcium octoate, the batch is re-esterified for 90 minutes at 240° C. The alkyd intermediate, upon addition of 40 parts phthalic anhydride and 40 parts tetrahydrophthalic anhydride is prepared by solvent reaction at 200° C. through esterification to an acid value of 25 mg KOH/g. After vacuum-stripping of the solvent, the resin has an acid value of 21.6 mg KOH/g and an intrinsic viscosity of 6.6 ml/g.

At 80° C., 95 parts of the above alkyd intermediate are homogeneously blended with 11 parts methylisobutyl ketone and, upon addition of 5 parts of toluylene diisocyanate, reheated to 90° C. After 60 minutes, 0.2 parts stannous dibutyldilaurate are added and the temperature is held for another 5 hours. The resulting resin with a solids content of 90.6%, an acid value of 20 mg KOH/g and an intrinsic viscosity of 9.1 ml/g is emulsified in 139 parts water after addition of 3.5 parts triethyl amine. The emulsion has a solids content of 40% and a pH-value of 9.25.

EXAMPLE 6

The following example illustrates the preparation of a water-emulsifiable acrylic modified alkyd resin.

An intermediate product is prepared by etherification at 140° C. for a period of 60 minutes of 90 parts of the isomerized linseed oil of Example 5, 40 parts PEG (average molecular weight 1500), 20 parts PK 3 and 5 parts dehydrated castor oil fatty acid followed by condensation at 200° C. for 90 minutes. The intermediate product is re-esterified at 240° C. with 65 parts linseed oil fatty acid, 80 parts p-tert. butyl benzoic acid, 90 parts pentaerythritol, 10 parts trimethylol propane, and 0.2 parts lead octoate and 0.2 parts calcium octoate. Then, at 200° C., 100 parts of an acrylic resin intermediate as hereinafter described are slowly added and esterified in a solvent reaction for 3 hours. Subsequently, 40 parts phthalic anhydride, 30 parts tetrahydrophthalic anhydride, and 30 parts hexachloroendomethylene tetrahydrophthalic acid are added and the esterification is continued at 190° C. until an acid value of 20 mg KOH/g is obtained. After stripping of the solvent the resin has an acid value of 17.5 mg KOH/g and an intrinsic viscosity of 10.2 ml/g.

Upon addition of 60 parts BUGL and 16 parts triethylamine the resin is emulsified in 725 g of water. The emulsion has a solids content of 40% and a pH-value of 8.9.

The acrylic resin intermediate as above used is a copolymer of 70 parts methylmethacrylate, 25 parts styrene, and 5 parts acrylic acid, prepared by reaction in 100 parts xylene in the presence of 2 parts di-tert. butyl peroxide, at 135°–140° C. to a solids content of 50.7%; an acid value of 39.5 mg KOH/g and an intrinsic viscosity of 14.3 ml/g.

COMPARISON EXAMPLES

In order to demonstrate the special advantages of the process of the invention, a resin having the constituents of Example 1 is prepared in conventional manner (Comparison Example A). In Comparison Example B, in order to enhance the stability of Comparison Example A, the PEG level was raised by 15%. According to this method, the PEG is connected through ester linkages only.

COMPARISON EXAMPLE A

In the presence of 0.2 parts each of lead and calcium octoate 90 parts tung oil, 40 parts linseed oil fatty acids, 105 parts p-tert. butylbenzoic acid, 95 parts pentaerythritol and 20 parts PK 1 are esterified at 240° C. for 90 minutes. Upon addition of 80 parts phthalic anhydride, 20 parts tetrahydrophthalic anhydride and 32 parts PEG (average molecular weight 1500), the esterification is continued at 200° C. until the values obtained in Example 1 are reached. An emulsion prepared according to Example 1 is more turbid and has a lower viscosity which means a greater particle diameter and, accordingly, the emulsion stability would be expected to be poorer.

COMPARISON EXAMPLE B

A comparison example the same as Comparison Example A is prepared; however, 38 parts PEG are used, and the final resin has an acid value of 17.9 mg KOH/g and an intrinsic viscosity of 9.1 ml/g. An emulsion prepared therefrom has transparency and structured viscosity properties similar to Example 1.

A comparison test of emulsion stability between Example 1 and Comparison Examples A+B was carried out by slow stirring at 80° C., with the following results:

Example (1) after 24 hours: fall off in viscosity and transparency, no sedimentation
Comparison Example (A) after 7 hours: coagulated
Comparison Example (B) after 7½ hours: coagulated

EVALUATION OF PIGMENTED PAINTS

Paints were prepared from the emulsions of Examples 1 to 6 and Comparison Examples A and B. The paints were pigmented in a pigment/binder ratio of 1:1 with titanium dioxide and contained 3% (on resin solids) of a water-compatible siccative blend containing 1.2% Co, 7.2% Ba, and 3.2% Zn, 1% of an anti-skinning agent and 0.5% of a flow agent. The paints were diluted to application viscosity with deionized water.

TEST FOR STORAGE STABILITY

The paint was placed in a closed container at 40° C. for 3 weeks. Information as follows was recorded: change in viscosity (A), sedimentation tendency (B), and, if applicable, regeneration (C).

TEST FOR DRYING CHARACTERISTICS 24 hours after the preparation of the paint films, they are applied to glass plates in a dry film thickness of 30 μm. Drying time is recorded.

TEST FOR WATER RESISTANCE 24 hours after air drying of the paint film, the films are soaked for 24 hours in water at 20° C.

The following abbreviations are used in Table 1:

STORAGE STABILITY (A) viscosity:
  VA: fall off
  LVA: slight fall off
(B) sedimentation tendency:
  LA: slight sedimentation
  KG: coagulated; in brackets is the number of days
(C) regeneration:
  REG: paint can be normalized by adding 0.1% triethylamine; sediments can be stirred in
  NREG: paint cannot be regenerated

WATER RESISTANCE (A) condition immediately after the test:
  LE: slightly softened
  E: softened
  SE: very soft
(B) after 8 hours:
  REG: regenerated or returned to original condition
  RB: wrinkling
(C) blisters according to DIN 53 209
i.o. stands for in order

TABLE 1

| Example | 1 | Comp. Ex. A | Comp. Ex. B | 2 | 3 | 4 | 5 | 6 |
|---|---|---|---|---|---|---|---|---|
| Storage Stability (A) | VA | — | — | LVA | i.O. | i.O. | LVA | VA |
| (B) | LA | KG(4) | KG(8) | LA | i.O. | i.O. | i.O. | LA |
| (C) | REG | N.REG | N.REG | REG | — | — | REG | REG |
| Drying | | | | | | | | |
| Tack free after hours | 1.5 | 1.5 | 2.5 | 2 | 4 | 5.5 | 1.2 | 1.5 |
| Touch dry after hours | 6.5 | 6.5 | 8 | 8 | 12 | 12 | 4 | 8.5 |

TABLE 1-continued

| Example | 1 | Comp. Ex. A | Comp. Ex. B | 2 | 3 | 4 | 5 | 6 |
|---|---|---|---|---|---|---|---|---|
| Pendulum hardness after 1 week (DIN 53 154) | 52 | 50 | 43 | 45 | 38 | 41 | 59 | 50 |
| Water Resistance (A) | LE | LE | SE | LE | E | LE | LE | LE |
| (B) | REG | REG | RB | REG | REG | REG | REG | REG |
| (C) | m0/g0 | m0/g0 | ml/g2 | m0/g0 | m0/g0 | m0/g0 | ml/gl | ml/gl |

The test results establish the especially improved stability of the paint binders made in accordance with the process of the claimed invention and of paints including the emulsions. Moreover, it will be apparent that various modifications can be made in the working examples including a substitution of materials and a variation in the reaction sequence. Such modifications and others being within the ability of one skilled in the art are within the scope of the present invention and appended clams.

It is claimed:

1. Process for producing water-emulsifiable airdrying paint binders based on modified drying oils, characterized in that in a first reaction step
    10-35% by weight of a polyethylene glycol with an average molecular weight of between about 500 and 5000, and
    5-25% by weight of a low molecular weight formaldehyde condensate of a mono ($C_3$–$C_9$) alkyl phenol and/or aryl phenol obtained through alkaline condensation, are reacted at from about 100° to 160° C., and the reaction product is condensed in a second reaction step at from about 180° to 250° C. with
    40-85% by weight of a substantially hydroxy-free ester of unsaturated oil fatty acids and polyols and the obtained product in a third reaction step is processed to provide an alkyd resin or oil binder, the weight ratios and reaction conditions being chosen whereby the final product has a level of from about 4 to 12% by weight of polyethylene glycol and an acid value of from about 10 to 30 mg KOH/g.

2. Process according to claim 1 wherein the etherification of the phenol formaldehyde condensate is carried out in the presence of at least a part of the oil fatty acid ester used in the condensation or second reaction step.

3. Process according to claim 1 wherein the polyethylene glycol has an average molecular weight of from 1000 to 3000.

4. Process according to claim 1 wherein the phenol is p-tert. butyl phenol.

5. Process according to claim 1 wherein the phenol is a blend of alkyl- and arylphenols.

6. Process according to claim 1 wherein the phenol formaldehyde condensate has an average methylol functionality of at least 1.5.

7. Process according to claim 1 wherein the phenol formaldehyde condensate has an average methylol functionality of at least 1.8.

8. Process according to claim 1 wherein etherification reaction step one is carried out in the presence of up to about 5% of an organic mono- or dicarboxylic acid.

9. Process according to claim 8 wherein said organic acid is an unsaturated oil fatty acid.

10. Process according to claim 8 wherein said organic acid is (meth)acrylic acid.

11. Process according to claim 8 wherein said organic acid is maleic acid.

12. Process according to claim 8 wherein said organic acid is fumaric acid.

13. Process according to claim 8 wherein said organic acid is a phthalic acid isomer.

14. Process according to claim 1 wherein the oil fatty acid esters have an iodine number of at least 125.

15. Process according to claim 1 wherein at least part of the double bonds of the oil fatty acid esters are in conjugated position.

16. Process according to claim 1 wherein the oil fatty acid ester is derived from at least one of tung oil, dehydrated castor oil or isomerized linseed oil.

17. Process according to claim 1 wherein an alkyd resin prepolymer or oil binder containing the polyethylene glycol-phenol formaldehyde condensate modified oil fatty acid ester is reacted with a polyisocyanate to provide a urethane-modified alkyd resin or urethane-modified oil.

18. Process according to claim 1 wherein an alkyd resin polymer or oil binder containing the polyethylene glycol-phenol formaldehyde condensate modified oil fatty acid ester is reacted with a vinyl monomer or prepolymer to provide a vinyl-modified alkyd resin or vinyl-modified oil.

19. Process according to claim 1 wherein an alkyd resin prepolymer or oil binder containing the polyethylene glycol-phenol formaldehyde condensate modified oil fatty acid ester is reacted with an acrylic monomer to provide an acrylic-modified alkyd resin or acrylic-modified oil.

20. Process according to claim 1 wherein an oil binder containing the polyethylene glycol-phenol formaldehyde condensate modified oil fatty acid ester is reacted with a hard resin to provide a hard resin modified oil.

21. A water-emulsifiable air-drying paint binder based on modified drying oils comprising the reaction product of a first reaction step wherein
    10-35% by weight of a polyethylene glycol with an average molecular weight of between about 500 and 5000, and
    5-25% by weight of a low molecular weight formaldehyde condensate of a mono ($C_3$–$C_9$) alkyl phenol and/or aryl phenol obtained through alkaline condensation, are reacted at from about 100° to 160° C., and such first reaction product is condensed in a second reaction step at from about 180° to 250° C. with
    40-85% by weight of a substantially hydroxy-free ester of unsaturated oil fatty acids and polyols and the obtained product in a third reaction step is processed to provide an alkyd resin or oil binder, the weight ratios and reaction conditions being chosen whereby the final product has a level of from about 4 to 12% by weight of polyethylene glycol and an acid value of from about 10 to 30 mg KOH/g.

22. The paint binder of claim 21 wherein the polyethylene glycol has an average molecular weight of from 1000 to 3000.

23. The paint binder of claim 21 wherein the phenol is p-tert. butyl phenol.

24. The paint binder of claim 21 wherein the phenol is a blend of alkyl- and arylphenols.

25. The paint binder of claim 21 wherein the phenol formaldehyde condensate has an average methylol functionality of at least 1.5.

26. The paint binder of claim 21 wherein the phenol formaldehyde condensate has an average methylol functionality of at least 1.8.

27. A paint including a water emulsion of a paint binder of claim 21.

* * * * *